United States Patent [19]

Furukawa et al.

[11] Patent Number: 4,558,877
[45] Date of Patent: Dec. 17, 1985

[54] STEERING SYSTEM FOR VEHICLES

[75] Inventors: Yoshimi Furukawa, Saitama; Shoichi Sano, Tokyo; Hiroshi Takamatsu, Saitama, all of Japan

[73] Assignee: Honda Giken Kogyo Kabushiki Kaisha, Tokyo, Japan

[21] Appl. No.: 558,151

[22] Filed: Dec. 5, 1983

[30] Foreign Application Priority Data

Dec. 8, 1982 [JP] Japan .................................. 57-214821

[51] Int. Cl.⁴ .............................................. B62D 7/00
[52] U.S. Cl. ...................................... 280/91; 180/140
[58] Field of Search ............... 180/140, 234, 236, 240; 280/771, 91, 95 R, 95 A, 96, 98, 99, 103; 74/39, 40, 42, 43, 50, 89, 89.16, 89.2, 496, 498

[56] References Cited

U.S. PATENT DOCUMENTS 2,666,491 1/1954 Johnson .............................. 180/240
3,370,667 2/1968 Bishop .................................. 180/240
4,406,472 9/1983 Furukawa ............................. 280/91

Primary Examiner—Joseph F. Peters, Jr.
Assistant Examiner—Ross Weaver
Attorney, Agent, or Firm—Irving M. Weiner; Pamela S. Burt

[57] ABSTRACT

A steering system for a vehicle including a front wheel and a rear wheel.

The steering system comprises a steering wheel, a front wheel steering sub-system for steering the front wheel in accordance with the steering angle of the steering wheel, and a rear wheel steering sub-system for steering the rear wheel in accordance with the steering angle of the steering wheel. The rear wheel steering sub-system has a reaction mechanism for keeping substantially constant the steering torque necessary for turning the rear wheel.

6 Claims, 9 Drawing Figures

STEERING SYSTEM FOR VEHICLES

BACKGROUND OF THE INVENTION

1. Field of the Invention

The present invention relates to a steering system for vehicles. Particularly, it relates to a steering system for a vehicle having front and rear wheels, in which the rear wheels as well as the front wheels are steerable by means of a steering wheel.

2. Description of Relevant Art

There have been proposed steering systems for vehicles, such as in Japanese Patent Application No. 56-118698, in which a rear wheel steering sub-system is provided with an off-centered pin directly or indirectly interconnecting left and right rear wheel turning tie rods, which off-centered pin is adapted to rotate by a revolution taken out from a front wheel steering sub-system, to thereby turn rear wheels in the same direction as front wheels and in the opposite direction thereto in accordance with the steering angle of a steering wheel.

In such a steering system for vehicles, the necessary revolution for turning the rear wheels is transmitted from the front wheel steering sub-system through a linkage to a rotatable member on which the off-centered pin is arranged so as to make a crank motion to thereby turn the rear wheels by a desired angle.

With such a steering system, for a vehicle having front and rear wheels, the rear wheels are able to be steered in the same direction as the front wheels for relatively small steering angles of the steering wheel and in the opposite direction thereto for relatively large steering angles thereof.

Accordingly, there is provided favorable vehicle maneuverability when travelling at relatively high speeds, as well as favorable vehicle turning characteristics due to relatively small turning radii possible with large steering angles such as in a U-turn or when steering in and out of a parking space.

However, in such a steering system for vehicles, in which the crank motion of the off-centered pin is converted into a reciprocal motion of the rear wheel turning tie-rods, the steering torque necessary for turning the rear wheels is subjected to a variation such that the steering feeling becomes relatively heavy in the vicinity of the original or neutral position of the rear wheels and, contrary thereto, relatively light near the full-turn position the rear wheels will have each time when turned in the same direction as the the front wheels and in the opposite direction thereto.

The present invention has been achieved to favorably solve such a problem in a conventional steering system for vehicles.

SUMMARY OF THE INVENTION

According to the present invention, there is provided a steering system for a vehicle including a front wheel and a rear wheel, comprising a steering wheel, a front wheel steering subsystem for steering the front wheel in accordance with the steering angle of the steering wheel, and a rear wheel steering sub-system for steering the rear wheel in accordance with the steering angle of the steering wheel, the rear wheel steering sub-system having a reaction mechanism for keeping substantially constant the steering torque necessary for turning the rear wheel.

Accordingly, an object of the present invention is to provide a steering system for a vehicle including front and rear wheels, which permits the front and rear wheels to be both steered, while keeping the steering feeling substantially constant irrespective of the rear wheel's steered angle.

The above and further features, objects and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 4:
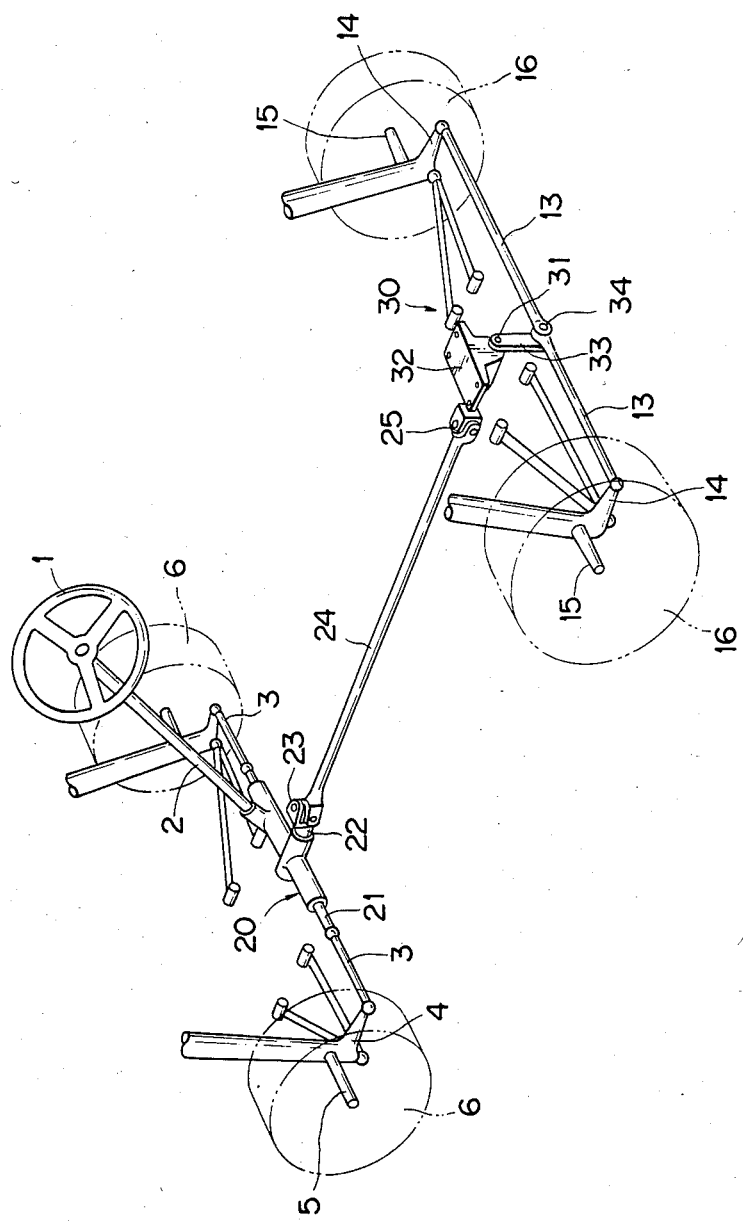
FIG. 4 is a schematic perspective view of a conventional steering system for vehicles.

With reference to FIG. 4, there will be first described a steering system for vehicles belonging to the prior art.

In FIG. 4, designated at reference numeral 1 is a steering wheel. The steering wheel 1 is provided with a steering shaft 2 assembled at the distal end thereof in a front wheel steering gearbox 20 of a rack and pinion type. In the gearbox 20, the steering shaft 2 has at the distal end a drive pinion (not shown) secured thereto and engaged with a rack (not shown) formed on the right-half part of a rack shaft 21. The rack shaft 21 is projected at either end thereof from both sides of the front steering gearbox 20 and connected to respective inner ends of a pair of tie rods 3, 3, each respectively connected at the outer end thereof to one of a pair of knuckle arms 4, 4 which have their axle shafts 5, 5 projecting outwardly and respectively supporting a pair of front wheels 6, 6.

The steering of the front wheels 6, 6 is effected by the transverse movement of the rack shaft 21 in a well known manner.

The rack shaft 21 is formed on the left-half part thereof with another rack (not shown) engaged with a driven pinion (not shown) which has a pinion shaft 22 projecting rearwardly from the gearbox 20. The pinion shaft 22 is connected at the rear end thereof through a universal joint 23 to the front end of a relatively long link shaft 24 which is in turn connected at the rear end thereof through a universal joint 25 to the front end of an input shaft 31 of a rear wheel turning mechanism 30. The input shaft 31 is a rotatable member supported by a bearing bracket 32 and disposed in alignment with the longitudinal centerline of a vehicle body (not shown). To the rear end of the input shaft 31 is perpendicularly secured a crank arm 33 which has on the rear face thereof an off-centered pin 34 integrally secured thereto and commonly carrying the respective inner ends of left and right rear tie rods 13, 13. The tie rods 13, 13 are respectively connected at their outer ends to a pair of knuckle arms 14, 14 which have their axle shafts 15, 15 projecting outwardly and respectively supporting a pair of rear wheels 16, 16.

In the above arrangement, when the steering wheel 1 is operated to be steered, the necessary revolution for turing the rear wheels 16, 16 will be output at the pinion shaft 22 and input through the link shaft 24, thereby rotating, to the input shaft 31 of the rear wheel turning mechanism 30. In accordance with the rotation of the input shaft 31, the off-centered pin 34 which is integrally secured thereto through the crank arm 33 and initially positioned right under the axis of rotation of the input shaft 31 will rotate in a crank manner together with the respective inner ends of the tie rods 13, 13, thus reciprocally carrying the tie rods 13, 13 in the transverse direction of the vehicle body, thereby transversely turning the knuckle arms 14, 14 and the rear wheels 16, 16.

As a result, the rear wheels 16, 16 will be turned in the same direction as the front wheels 6, 6 for relatively small steering angles of the steering wheel 1, corresponding to the range from the initial position to one-half revolution (180°) of the off-centered pin 34, while the maximal turning angle of the rear wheels 16, 16 will be given at one-fourth revolution (90°) of the off-centered pin 34; and in the opposite direction thereto for relatively large steering angles corresponding to the range exceeding one-half revolution of the off-centered pin 34, while in this case the maximal turning angle will be given at three-fourth revolution (270°).

Referring now to FIGS. 5 to 9, there will be described hereinbelow the steering torque variation the above-described steering system is subjected to when, for example, travelling at an extremely low speed.

Figure 5:
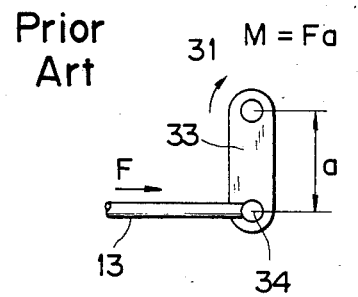
FIGS. 5 to 8 are enlarged rear views showing various working states of an essential part of a rear wheel steering sub-system of the steering system of FIG. 4.

When the input shaft 31 is caused to rotate clockwise, as shown in FIG. 5, the left tie rod 13 will first be pushed to move leftwardly, while receiving a resisting force F. Assuming the distance between the input shaft 31 and the off-centered pin 34 to be a, the necessary torque M of the input shaft 31 to initiate the turning of the left rear wheel 16 will then be given by the following expression:

$$M = Fa \quad \text{(i)}$$

Figure 6:
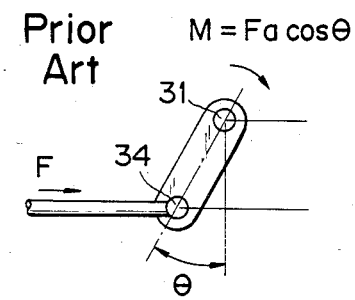

As shown in FIG. 6, when the input shaft 31 is rotated by an angle $\theta$ from the initial position thereof, the necessary torque M becomes as follows, while the resisting force F to the tie rod 13 is assumed constant:

$$M = Fa \cos \theta \quad \text{(ii)}$$

Figure 7:
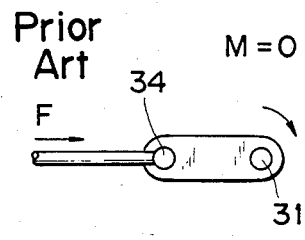

Hence, after further rotation of the input shaft 31, when the rotation angle $\theta$ has reached 90° as shown in FIG. 7, the torque M becomes zero, i.e.:

$$M = Fa \cos 90° = 0 \quad \text{(iii)}$$

Figure 8:
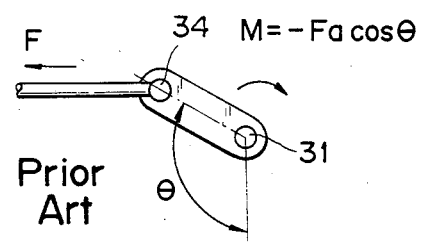

Furthermore, after the rotation angle $\theta$ of the input shaft 31 has passed 90°, the left tie rod 13 will be pulled to move rightwardly as shown in FIG. 8, receiving the resisting force F acting in the opposite direction. Therefore, the torque M becomes such that:

$$M = -Fa \cos \theta \quad \text{(iv)}$$

Figure 9:
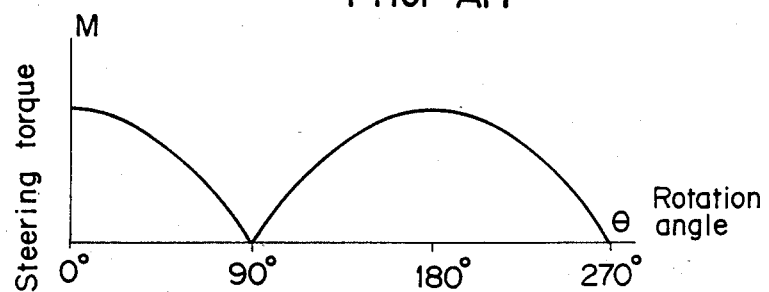
FIG. 9 is a graph showing the operating characteristic of the rear wheel steering sub-system of FIGS. 5 to 8.

As will be understood from the expressions (i) to (iv), the necessary torque M for turning either of the rear wheels 16, 16 varies as shown in FIG. 9, in which the ordinate represents the steering torque M and the abscissa represents the rotation angle $\theta$. Namely, in the conventional steering system of FIG. 1, the steering torque M becomes relatively large in the vicinity of rotation angles 0° and 180° of the input shaft 31, which angles correspond to the neutral position of the rear wheels 16, 16, and approaches substantially zero in the vicinity of rotation angles 90° and 270° thereof, which angles respectively correspond to the full-turn positions of the rear wheels 16, 16 as turned in the same direction as and in the opposite direction to the front wheels 6, 6.

Figure 1:
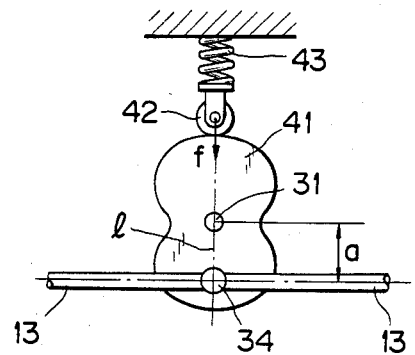
FIG. 1 is a rear view of a reaction mechanism of a steering system for vehicles according to the present invention.
Figure 2:
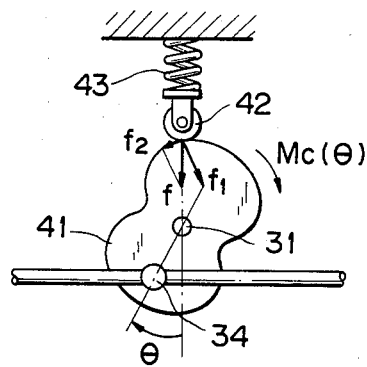
FIG. 2 is a rear view showing a working state of the reaction mechanism of FIG. 1.
Figure 3:
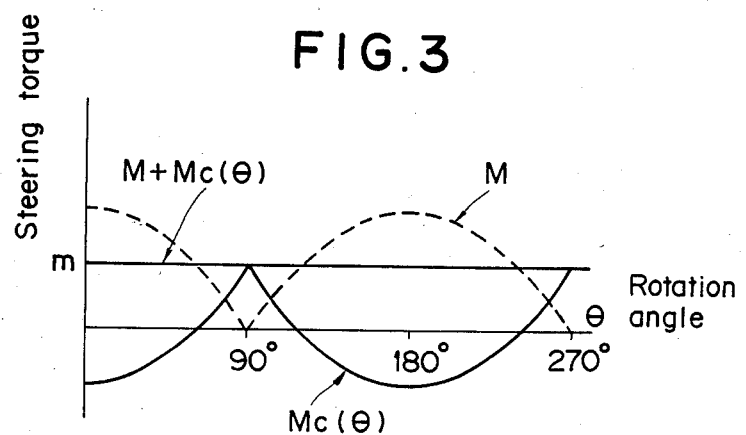
FIG. 3 is a graph showing the operating characteristic of the reaction mechanism of FIG. 1.

Referring now to FIGS. 1 to 3, there will be described hereinbelow a reaction mechanism of a rear wheel steering subsystem of a steering system for vehicles according to the present invention, whereas the steering system has an arrangement similar to that of the conventional steering system of FIG. 1 excepting the crank portion between the input shaft 31 and the off-centered pin 34. accordingly, similar parts are designated by the same reference numerals.

In FIG. 1, designated at reference numeral 41 is a plate cam shaped in the configuration of a symmetrical peanut or gourd or a pair of ellipsoidal cams symmetrically joined with each other. The cam 41 is perpendicularly fixed at the center of symmetricity thereof to the rear end of an input shaft 31, and provided on the rear face thereof with an off-centered pin 34 projecting rearwardly therefrom and commonly carrying the respective inner ends of left and right rear wheel turning tie rods 13, 13. The off-centered pin 34 is located on a centerline l of the cam 41 at a distance a from the input shaft 31, the centerline l passing through the center of symmetricity and being initially positioned upright.

Upon the gourd-shaped circumference of the cam 41, there is pressed a push roller 42 as a cam follower by means of a compressed coil spring 43 interposed between the push roller 42 and a vehicle body. The push roller 42 is thus resiliently biassed to be pushed, right downwardly in this embodiment, toward the center of symmetricity of the cam 41.

The pushing force of the push roller 42 acting upon the cam 41 is now assumed f. As shown in FIG. 2, when the input shaft 31 is caused to rotate clockwise by an angle $\theta$, the contact point between the cam 41 and the push roller 42 will move along the circumference of the cam 41, thus varying components $f_1$ and $f_2$ of the pushing force f in the normal and tangential directions, respectively, of the circumference at the contact point. The components $f_1$, $f_2$ will correspondingly produce a reaction moment $Mc(\theta)$ about the input shaft shaft 31.

As will be understood from FIG. 3, in which the ordinate represents the steering torque necessary at the input shaft 31 for turning either rear wheel and the abscissa represents the rotation angle of the input shaft 31, the conventional variation of the steering torque M can be cancelled by designing the profile of the cam 41, the size of the roller 42 and the resilient force of the spring 43 for a voluntary reference value m such that:

$$M + Mc(\theta) = m \quad \text{(v)}$$

Therefore, according to this embodiment, the steering torque necessary for turning a pair of rear wheels can be kept substantially constant by a reaction mechanism provided for an input shaft of a rear wheel turning mechanism, the reaction mechanism comprising a cam, a cam follower, and a biasing member for normally biasing to press the follower against the cam.

In the above-described embodiment, the cam 41 is adapted to concurrently serve as a conventional crank arm. In this respect, it will be understood that there may be employed a modified example including a conventional rear wheel turning mechanism having a crank arm secured to an input shaft and a reaction mechanism having a cam integrally fitted on the input shaft. Moreover, there may be employed a reaction mechanism having a cam fitted on a voluntary shaft operatively connected through a gearing or the like to a conventional rear wheel turning mechanism. It will also be understood that, in a further modified embodiment of the invention, a steering system may comprise a front wheel steering sub-system of any other conventional type, and a rear wheel steering sub-system having a rear wheel turning mechanism of any other suitable type and a reaction mechanism for producing a reaction force to keep constant the steering torque necessary for turning a rear wheel.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A mechanical steering system for a vehicle including a front wheel and a rear wheel, comprising:
   a steering wheel;
   a front wheel steering sub-system for steering said front wheel in accordance with the steering angle of said steering wheel;
   a rear wheel steering sub-system for steering said rear wheel in accordance with the steering angle of said steering wheel; and
   said rear wheel steering sub-system having mechanical means for producing a torque so as to compensate for the variation of the steering torque necessary for turning said rear wheel.

2. A steering system according to claim 1, wherein:
   said rear wheel steering sub-system includes a rear wheel turning mechanism for turning said rear wheel in the same direction as and in the opposite direction to said front wheel in accordance with the steering angle of said steering wheel;
   said rear wheel turning mechanism comprises a shaft member operatively connected to said steering wheel, an off-centered member off-centered with respect to said shaft member and arranged integrally rotatable therewith, and a reciprocally movable member operatively interconnecting said off-centered member and said rear wheel; and
   said torque producing means produces a torque exertable on said shaft member.

3. A steering system according to claim 2, wherein:
   said torque producing means comprises a cam member secured to said shaft member, a cam follower, and a biasing member for resiliently biasing to press said cam follower against said cam member.

4. A steering system according to claim 3, wherein:
   said cam member comprises a plate cam shaped substantially in the configuration of a symmetrical gourd and fitted at the center of symmetricity thereof on said shaft member.

5. A steering system according to claim 3, wherein:
   said off-centered member is secured to said cam member.

6. A steering system according to claim 3, wherein:
   said off-centered member is secured to one end of an arm member secured at the other end thereof to said shaft member.

* * * * *